(12) United States Patent
Deeds (10) Patent No.: US 6,710,715 B2
(45) Date of Patent: Mar. 23, 2004

(54) ALARM SYSTEM WITH INTEGRATED WEATHER ALERT FUNCTION

(76) Inventor: Douglas Arthur Deeds, 821 Voltamp Dr., Fort Worth, TX (US) 76108

( * ) Notice: Subject to any disclaimer, the term of this patent is extended or adjusted under 35 U.S.C. 154(b) by 82 days.

(21) Appl. No.: 09/769,837

(22) Filed: Jan. 25, 2001

(65) Prior Publication Data

US 2002/0097161 A1 Jul. 25, 2002

(51) Int. Cl.[7] .................................................. G01W 1/00
(52) U.S. Cl. .................. 340/601; 340/539; 340/825.44; 340/311.1; 340/540
(58) Field of Search ................................ 340/601, 539, 340/825.44, 311.1, 628, 286.05, 540

(56) References Cited

U.S. PATENT DOCUMENTS

| | | | | |
|---|---|---|---|---|
| 3,603,951 A | * | 9/1971 | Bracken et al. ............. | 340/182 |
| 3,611,365 A | * | 10/1971 | Lundquist et al. ........... | 340/421 |
| 5,121,430 A | * | 6/1992 | Ganzer et al. ................ | 380/48 |
| 5,565,909 A | * | 10/1996 | Thibadeau et al. ............ | 348/9 |
| 5,628,050 A | * | 5/1997 | McGraw et al. ............ | 455/12.1 |
| 5,781,852 A | * | 7/1998 | Gropper ..................... | 455/227 |
| 6,121,885 A | * | 9/2000 | Masone et al. ............. | 340/628 |
| 6,329,904 B1 | * | 12/2001 | Lamb .................... | 340/286.02 |

* cited by examiner

Primary Examiner—Jeffery Hofsass
Assistant Examiner—Hung T Nguyen (57) ABSTRACT

Apparatus, and an associated method, annunciates a weather anomaly condition at an area encompassed by an annunciating system. A receiver is coupled to receive indications of a warning representative of the weather anomaly. The receiver detects reception thereat of the indications of the warning. An annunciator is remotely coupled to the receiver. The annunciator annunciates, in human perceptible form, the detection at the receiver of the indications of the warning representative of the weather anomaly.

15 Claims, 4 Drawing Sheets

ALARM SYSTEM WITH INTEGRATED WEATHER ALERT FUNCTION

BACKGROUND OF THE INVENTION

1. Field of the Invention

This invention relates to alarm systems and, more particularly to an alarm system having an integrated weather alert function.

2. Relevant Background

Use of fire, burglar, or combination alarm systems has become increasing popular, both as a life saving measure from fires and also as a deterrent to intrusion as the incidence of crime has risen. Alarm systems are regularly installed into new residences and are frequently installed into older homes. The alarm systems typically consist of at least three parts: a central control unit, one or more remote user interfaces, and one or more sirens, strobe lights or other audible or visual indicators. Connections between parts of the system may use wires or can be connected wirelessly using radio frequency waves as a means of signaling. At minimum, the central unit contains an interface for burglar and/or fire sensors, a controller that implements timing and logic functions and output circuitry to drive audible or visual indicators. The system also contains systems necessary, but ancillary to, the overall operation. Most systems, but especially those that monitor for fire, usually include a backup battery to allow operation to continue for some time after the mains power has been lost.

Burglar and fire alarm systems are generally economical to own due to the business model taken by a majority of companies providing them in the market. Many systems are installed as a part of a deal whereby the consumer enters into a contractual obligation to purchase monitoring over a time period. Thus the purchase cost of the alarm system to the consumer is minimal at the time of installation due the actual cost being deferred into the monitoring fees charged over the lifetime of the contract. Some alarm systems are low cost in their own right due to trends of decreasing cost of electronic systems. In addition, many insurance companies reduce the rate of homeowner insurance for homes with an installed alarm system. These factors result in alarm systems being installed into a large percentage of residences as well as small businesses and other buildings.

The National Weather Service (NWS) is an agency with the Department of Commerce's National Oceanic and Atmospheric Administration. Beginning in the late 1950s, the NWS, then the U.S. Weather Bureau, started developing a voice radio broadcast system to provide more frequent and specialized weather information to the general public and users with unique weather needs than was available from the commercial radio and television services. The service was eventually named NOAA Weather Radio (NWR). Operating frequencies are in the Federal Government's Very High Frequency (VHF) band between 162.400 and 162.550 MHz.

A special feature of the NWR system that evolved in the 1960s was the transmission of a single tone at 1050 Hz prior to the broadcast of any message about a life or property-threatening event. This became known as the Warning Alarm Tone (WAT). Special receivers that are electronically switched on and receiving the broadcast signal, but the speaker is in a muted state, are made by several companies. When this type of radio detects the WAT, it automatically turns on the speaker allowing the alerting tone, then the alert message to be heard without the need for the owner/user to do anything.

Starting in 1985, the NWS began experimenting with putting special digital codes at the beginning and end of any message about a life beginning and end of any message about a life or property-threatening event. The intent was to ultimately transmit a code with the initial broadcast of all NWR messages. The system evolved into what is known today as NWR Specific Area Message Encoding (NWR SAME). The general specifications are described briefly in the following sections. Complete and up-to-date specifications can be obtained by contacting the National Weather Service.

The main purpose of the code created by NWR SAME is to provide enough information before and after the broadcast of a message so software routines can match preprogrammed user instructions. Its greatest value is to significantly improve the automatic selection and distribution of messages about events that threaten people and/or property.

An NWR SAME transmitted data message consists of six possible elements in the following sequence:

1) Preamble
2) Header code
3) Warning Alarm Tone/Attention Signal
4) Voice Message
5) Preamble
6) End of Message The coded message is transmitted, using audio frequency shift keying (AFSK), on the audio channel of the VHF NWR transmitter system. It is transmitted at no less than 80% modulation (+/−4.0 kHz deviation minimum, +/−5 kHz deviation maximum). The coded message and voice program audio is transmitted using standard pre-emphasis for narrow band VHF FM of 6 dB per octave increasing slope from 300 Hz to 3 kHz applied to the modulator.

The preamble and header code are transmitted three times with a one second pause (+/−5%) between each coded burst prior to the broadcast of the actual message. The End Of Message (EOM) consists of the preamble and EOM code transmitted three times with a one second pause (+/−5%) between each EOM burst. Each header and EOM data transmission consists of a string of eight 8-bit bytes with no start, stop, or parity bits. Bit and byte synchronization is attained by a preamble code at the beginning of each header code or EOM data transmission. Data transmissions are phase continous at the bit boundary.

One bit period equals 1920 microseconds (+/−1 microsecond). This equates to a data rate of 520.83 bits per second. A logic zero is 1562.5 Hz, a logic one is 2083.3 Hz.

The first 16 bytes (prior to the header code and EOM) of the data transmission is a preamble with each byte having the same value of hexadecimal AB (8 bit byte [10101011]). For all bytes, the least significant bit (LSB) is sent first. The bytes following the preamble constitute the actual message data transmission. The message data (header) code is transmitted using ASCII characters as defined in ANSI X.3.4-1977 with the eighth (8th) bit always set to zero.

The Warning Alarm Tone (WAT), if transmitted, is sent within one to three seconds following the third header code burst. The frequency of the WAT is 1050 Hz (+/−0.3%) for 8 to 10 seconds at no less than 80% modulation (+/−4.0 kHz deviation minimum, +/−5.0 kHz deviation maximum).

If transmitted, the actual voiced message begins within three to five seconds following the last NWR SAME code burst or WAT, whichever is last. The voice audio ranges between 20% modulation (+/−1 kHz deviation) and 90% modulation (+/−4.5 kHz) with occasional lulls near zero and peaks as high as but not exceeding 100% modulation (+/−5 kHz deviation). The total length of the message should not exceed two minutes.

NWS will occasionally send a continuous string of Preamble code, (Hex AB) or a continuous tone through its communications links to the NWR transmitters, for several seconds up to around one minute. This will be done to align the program console, communications links, and transmitters for optimum system performance.

In symbolic form, the message code format is:
(Preamble) ZCZC-WXR-EEE-PSSCCC-PSSCCC+
   TTTT-JJJHHMM-LLLLLLLL-
(one second pause)
(Preamble) ZCZC-WXR-EEE-PSSCCC-PSSCCC+
   TTTT-JJJHHMM-LLLLLLLL-
(one second pause)
(Preamble) ZCZC-WXR-EEE-PSSCCC-PSSCCC+
   TTTT-JJJHHMM-LLLLLLLL-
(one to three second pause)
1050 Hz Warning Alarm Tone (WAT) for 8 to 10 seconds (if transmitted)
Verbal/spoken oral text of message (if transmitted)
(Preamble) NNNN
   (one second pause)
(Preamble) NNNN
   (one second pause)
(Preamble) NNNN
Symbol Definitions
(Preamble)

This is a consecutive string of bits (sixteen bytes of hexadecimal AB [8 bit byte 10101011]) sent to clear the system, set automatic gain controls, and set asynchronous decoder clocking cycles. The preamble must be transmitted before each header code and EOM code.

"ZCZC-"

This header code block is the identifier, sent as ASCII characters ZCZC to indicate the start of the ASCII header code data transmission.

"-" (Dash)

This "Dash" is sent following each type of code information block in the header except prior to the message valid time.

"WXR-"

This header code block identifies the message as a voice message from a NWR system transmitter. There are other identifiers used by EAS stations as defined in FCC rules Part 11.

"EEE-"

This header code block identifies the type of event and information contained in the verbal message, if a verbal message is sent. The event code may be sent with or without a WAT or verbal message as an alerting function only. It also may be sent as a control code for some NWR system control functions.

"PSSCCC-"

This header code block identifies the geographic area affected by the NWR SAME message. Each block of this coded information uniquely identifies a geographical area. A message may contain up to 31 blocks.

"P"

This part of the geographical area header code block allows for subdividing the area defined by the "CCC" into smaller parts in the case of very large or uniquely shaped area, or because of widely varying height, climate, or other geographic features. If a "P"=0, it means the entire or unspecified are defined by "CCC" is affected. If the "P" equals a number other than zero, the areas are defined as follows:

1=Northwest 1/9
2=North Central 1/9
3=Northeast 1/9
4=West Central 1/9
5=Central 1/9
6=East Central 1/9
7=Southwest 1/9
8=South Central 1/9
9=Southeast 1/9

If the part is larger than 1/9 of the "CCC", the following numbering convention is normally used depending on the desired size and/or orientation of the area such as from Northwest to Southeast, North to South, West to East, or Northeast to Southwest:

1=Northwest 1/3 or 1/2 as appropriate
2=North 1/3 or 1/2 as appropriate
3=Northeast 1/3 or 1/2 as appropriate
4=West 1/3 or 1/2 as appropriate
5=Central 1/3
6=East 1/3 or 1/2 as appropriate
7=Southwest 1/3 or 1/2 as appropriate
8=South 1/3 or 1/2 as appropriate
9=Southeast 1/3 or 1/2 as appropriate

"SS"

This part of the geographical area header code block is the number of the state as defined by the Federal Information Processing System (FIPS) number as described in the U.S. Department of Commerce in National Institute fo Standards and Technology (NIST) publication #772. Special "SS" codes are assigned to those areas not defined by this publication such as the open waters of the Atlantic, Pacific, Gulf of Mexico, and Great Lakes. The most current list of special "SS" codes may be obtained from the NWS or the FCC upon request.

"CCC"

This part of the geographical header code block is a number normally assigned to each country in the United States by the FIPS. Special "CCC" codes are assigned to those areas not defined by the NIST publication #772. These include the open waters of the Atlantic, Pacific, Gulf of Mexico, and Great Lakes and to special alerting zones adjacent to and near unique storage or production facilities. A "CCC" of 000 applies to the entire state or area identified in the "SS" section of the code. The most current list of these special "CCC" codes may be obtained from either the NWS or the FCC upon request.

Location codes transmitted over NOAA Weather Radio frequencies, but originated originally by security or communications centers at special hazardous materials storage or production facilities, my contain a combination of numbers, letters, and other characters. The authorized set is ASCII characters decimal 10, and 13 and decimal 33 through decimal 127. ASCII characters decimal 43 and 45 may not be part of the six character location code, but used only at the end of the block as shown previously in the symbolic form. The ASCII character decimal 42, "*", is reserved for use as a wild card only. These become special location codes containing a combination of geographic and instructional information to activate customized receivers, pre-stored text messages, and/or other special equipment.

These codes will not be sent as part of NWS originated NWR SAME messages. NWR receivers with SAME decoders should not respond to such codes for NWS NWR or EAS purposes. Systems receiving NWR broadcasts and providing further redistribution my want to pass them along in any retransmission of the header code. Radio, television, or cable systems covered by FCC Rules Part 11 are not prohibited from using these codes in peripheral equipment or ancillary functions to basic EAS equipment to further enhance the safety of the public in cooperation with local government officials or facility managers.

An NWR or EAS text standard over and above this special application of the location code is not defined under these specifications or EAS rules. A text standard could be developed using the basic NWR SAME/EAS protocol, but identified as a test message using a variation of the Originator code. The Originator Code in this section is reserved for voice messages only and decoders should reject any message that does not match this currently defined code set.

Numbers from 900 to 999 are reserved for assignment to unique non-FIPS defined alerting areas adjacent to facilities that store or produce nuclear, chemical, and biological material. For the most current list of these areas, contact the NWS or FCC.

"+TTTT-"

This header code block identifies the purge time of the message expressed in a delta time from the issue time in 15 minute segments up to one hour. Then in 30 minute segments beyond one hour up to six hours; ie +0015-, +0030-, +0045-, +0100-, +0430-, +0600-. This delta time, when added to the issue time, specifies when the message is no longer valid and should be purged from the system, not to be used again. It is important to note that the valid or purge time of the message will not always equal the event expiration time. For most short-term events such as tornadoes and thunderstorms, the two times will most often be identical. For longer duration events, such as a hurricane or winter storm that may not end for many hours or days, the valid time in the code only applies to that message, and is not an indicator that the threat is over.

Weather receivers are increasingly being purchased as a means for consumers to become alerted to severe weather conditions. The alerts provide time for the users to both seek adequate shelter from life-threatening weather and to protect property. Weather receivers are also commonly used to obtain weather forecasts to plan outdoor and other day-to-day personal activities. Units containing SAME decoders have removed the annoyance of alerts not in the geographical location of the receiver, so usage has increased.

Weather receivers are currently available both as portable units and as desktop units to facilitate their use in different environments. In these roles, current receivers are limited in their effectiveness of alerting users. Due to practical and cost limitations, current designs can only alert users within a limited audibility range from the alert receiver. Users can only tolerate a limited sound intensity when they are in close proximity to the device, so the far range of audibility of the device is limited by the near field sound level (i.e. at arm's length to the speaker or other audio output transducer). The range of audibility will be decreased by objects, such as furniture or doors, between the alerting device and the user. The range of audibility may also be lowered by the physical layout of the user's premises. The size of the user's premises may also be larger than the maximum audible range of the alerting device. Some units such as Radio Shack models 12-249 and 12-250 allow connection of an external siren but doing so is beyond the skill of most users.

Practical and aesthetic limitations limit the size of the antenna that can be mounted on portable and desktop weather alert receivers. This limits their receiver performance. Some units such as Radio Shack models 12-247 and 12-250 allow external antennas to be attached. But again this is usually done only by skilled users.

Some severe weather conditions such as tornadoes require immediate recognition by the user so they can adequately prepare for the event. Other conditions such as nuclear events or toxic chemical releases also require a prompt response. This poses a problem: Most households own only one weather alert receiver due to the cost of the units. Users are likely to place the receiver in a location such as a living room or bedroom, where it has the highest likelihood to be heard. Even when the alert siren can be heard at other locations, the user may not be in the vicinity of the receiver to immediately hear the alert broadcast or view the text display of SAME data to identify. Users with physical impairments to rapid movement such as the elderly, persons in wheelchairs, etc. cannot quickly reach the alert receiver. Persons with hearing impairments must move close to the location of the receiver to see the text display of the weather receiver in order to determine the type of alert. Thus some persons may lose valuable time that could be otherwise used to reach a safe location. While users could carry a portable device within their household to decrease the time to respond, this is highly inconvenient.

SUMMARY OF THE INVENTION

This invention relates to alarm systems and, more particularly to an alarm system having an integrated weather alert function.

The present invention advantageously provides, therefore, apparatus, and an associated method, for annunciating an anomaly condition at an area encompassed by the annunciating system. The existence of a weather anomaly is annunciated. A receiver is coupled to receive indications of a warning representative of the weather anomaly. The receiver detects reception thereat of the indications of the warning. An annunciator is coupled to the receiver. The annunciator annunciates, in human perceptible form, the detection at the receiver of the indications of the warning representative of the weather anomaly.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

Figure 1:
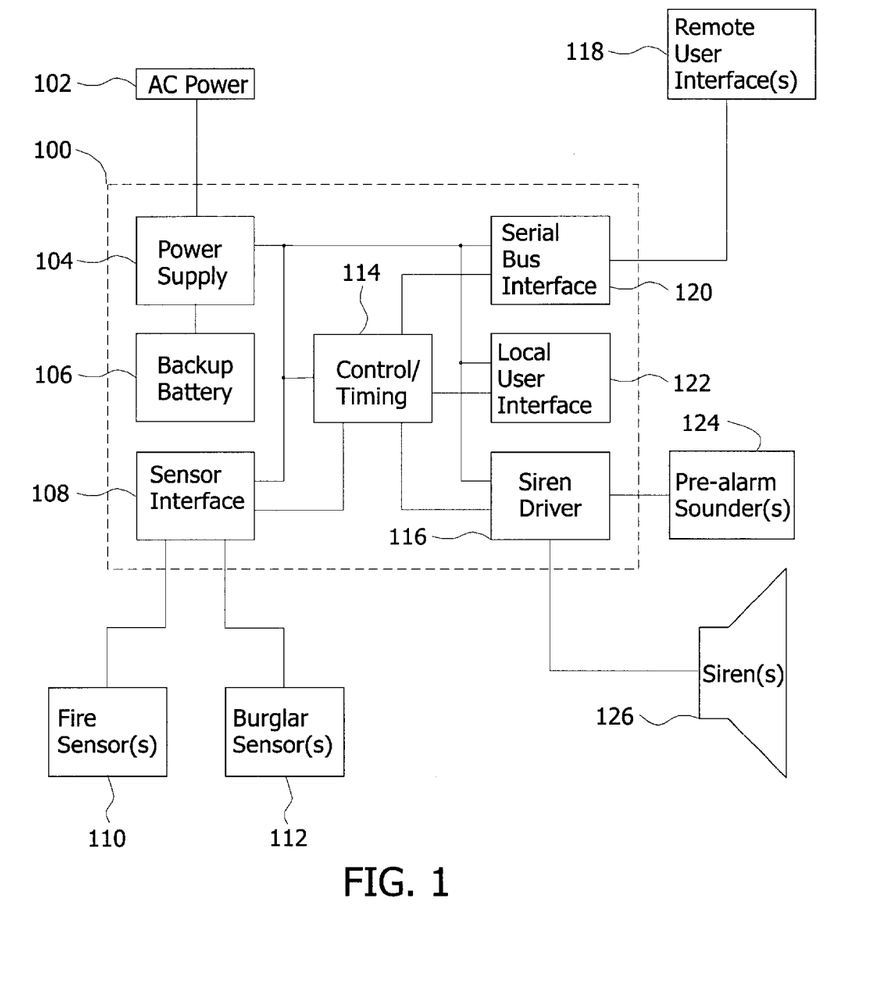
FIG. 1 is a block diagram of a conventional fire/burglar alarm system.

FIG. 1—Conventional Fire/Burglar Alarm System

FIG. 1 shows a functional fire and/or burglar alarm system. The system monitors burglar and/or fire sensors and initiates an alarm cycle when specified conditions occur.

The alarm panel 100 encompasses the centralized circuitry of the system. To meet regulatory standards, the alarm panel 100 typically is housed in a rugged enclosure to withstand environmental or vandalistic damage.

AC power supply 102 is a conventional transformer; it receives high voltage alternating current (AC) from the mains supply and outputs a lower voltage alternating current to power supply 104. AC power supply 102 may be external or internal to the alarm panel 100.

Power supply 104 is conventional; it receives low voltage alternating current power from the AC power supply 102 and supplies one or more direct current (DC) voltages to the rest of the alarm system. The distributed voltages may be regulated or unregulated depending on their ultimate use in the system. Backup battery 106 is charged by the power supply 104 under normal power conditions and supplies power to the rest of the system when AC mains power is unavailable. Many alarm systems use 12-volt lead-acid cells due to their large capacity and other desirable characteristics.

Alternatively, AC power supply 102 and power supply 104 could be combined into a switching power supply that takes mains level AC and converts it to direct current for the rest of the alarm circuitry.

The sensor interface 108 connects to fire sensors 110 and/or burglar sensors 112. The sensor interface 108 provides voltage level shifting between the sensors and the control and timing logic 114. The sensor interface 108 supplies a voltage or current that is passed to one or more sensors in loop configurations throughout a building or residence. The sensor interface 108 can support one or more loops. The sensor interface 108 monitors the status of the loops which can be normally closed (normal loop state is a closed circuit) or normally open (normal loop state is open circuit) and outputs the state of the loops to the control and timing logic 114. The circuitry of the sensor interface 108 will provide protection against external electromagnetic interference, such as lightning, ESD, radio waves, or other such noise. Additional noise rejection may also be performed by the control and timing logic 114. The loops may be monitored to provide an instant or a delayed alarm when the trigger conditions occur. Because sensor loops typically protect an area or a section of a perimeter of an area for a household or building, they are also referred to as zones.

The control and timing logic 114 provides intelligence for the system and may consist of discrete timing and logic circuitry, but more typically is a microcontroller or microprocessor with external memory. The microcontroller or microprocessor processes input states to determine if a change in the state of the alarm system is required. If a change of state is needed, the microcontroller or microprocessor will change its internal status as well as changing the state of outputs, such as sirens and relays. The microcontroller or microprocessor will also change the status presented to the user through the local user interface 122 and remote user interfaces 118. The status is also presented to the user through audible output devices such as the pre-alarm sounder 124 and siren 126. Processing of inputs and changing of output states may occur synchronously or asynchronously with other events in the system.

Siren driver 116 typically contains circuitry that connects one or more sirens 126 to the power supply 104 during normal conditions or to the backup battery 106 during a power failure condition. The sirens 126 contain circuitry to generate and amplify an audio signal to a high audio level. Some types of sirens 126 are designed to generate multiple types of audio cadences or frequencies to differentiate between the fire and burglar alarm conditions. Alarm systems that do not use the sirens that generate multiple outputs will use two or more sirens (each with a different type of output) to differentiate the type of alarm. The siren driver 116 or a separate pre-alarm driver connected to the pre-alarm sounder 124 will give a warning before the sirens 126 are turned fully on to indicate the alarm condition. The pre-alarm sounder 124 is typically used only for the burglar alarm or to indicate non-critical conditions. A fire condition is more serious and must be indicated immediately. The pre-alarm sounder 124 commonly sounds at the beginning of the entry delay started at the beginning of an alarm cycle when a delayed zone is triggered to indicate to the user that the alarm should be disarmed before an alarm occurs and the sirens 126 are sounded. The pre-alarm function may also be supplemented or replaced by a speaker or sounder in the remote user interface 118.

The local user interface 122 provides functionality for a user to arm and disarm the system, program the system, and/or to indicate the status of the system, including alarms. Not all alarm systems have a local user interface 122. Instead the same functionality is provided by the remote user interfaces 118. If present, the local user interface 122 is sometimes located inside the enclosure of the alarm panel 100 so settings cannot be changed inadvertently or by persons without proper authorization.

The serial bus interface 120 connects to one or more remote user interfaces 118. The serial bus interface 120 supplies power to the remote unit and also provides voltage level shifting for serial data communications between the control and timing logic 114 and the remote user interfaces 118. The remote user interfaces 118 provide the functionality for a user to arm and disarm the system, program the system, and/or to indicate the status of the system, including alarms.

Both the local user interface 122 and the remote user interfaces 118 may have functionality to allow the user to program settings such as entry and exit delays, enablement or disablement of zones, bypass zones, or interact with other features of the alarm system. The local user interface 122 typically consists of status indicators such as light emitting diodes or a liquid crystal display and switches, usually a numeric keypad, as well as other function related keys. The keypad and function keys are used both for entry of numbers to arm and disarm the system and also to program user settings.

Figure 2:
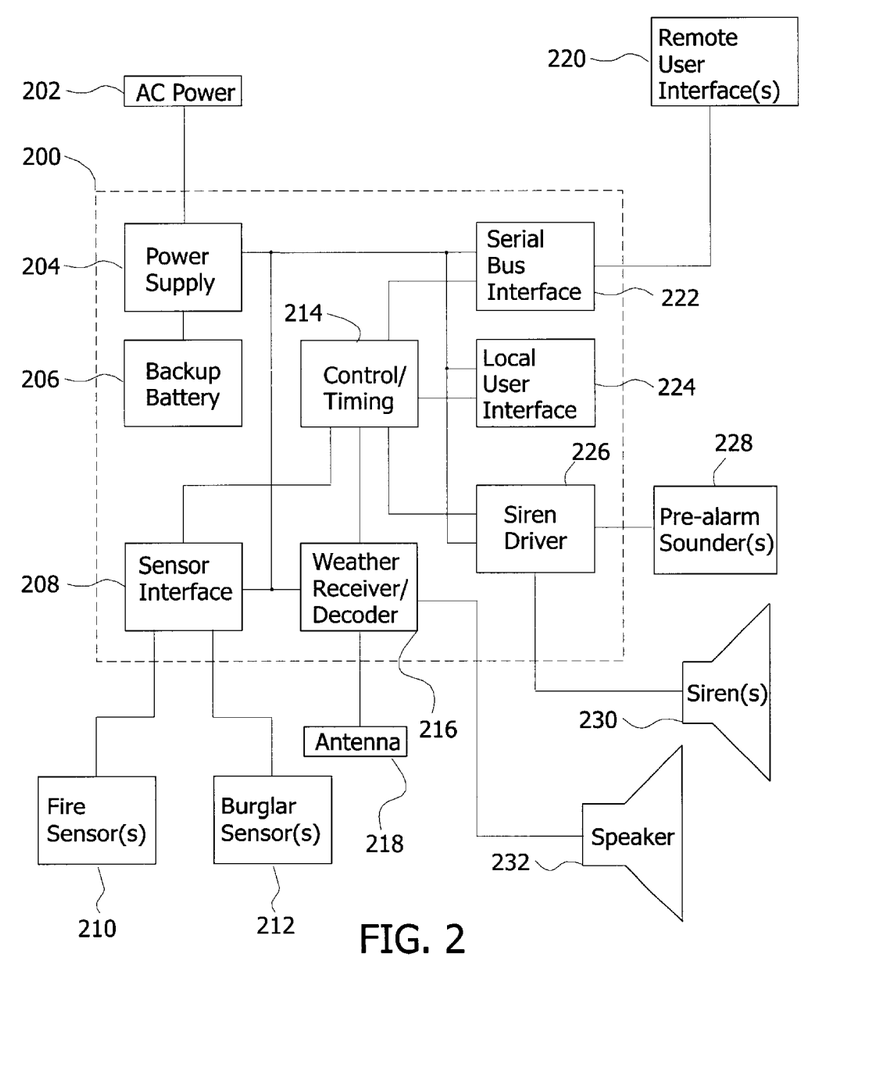
FIG. 2 is a block diagram of a fire/burglar/severe-weather alarm system.

FIG. 2.—Burglar/Fire/Severe-Weather Alarm System

FIG. 2 shows a functional burglar, fire, and severe weather alarm system. In addition to burglar and fire sensors, the system also monitors a weather alert receiver and initiates different types of alarm cycles when specified conditions occur.

The alarm panel 200 encompasses the centralized circuitry of the system. To meet regulatory standards, the alarm panel 200 is housed in a rugged enclosure to withstand environmental or vandalistic damage.

AC power supply 202 is a conventional transformer; it receives high voltage alternating current (AC) from the mains supply and outputs a lower voltage alternating current to power supply 204. AC power supply 202 may be external or internal to the alarm panel 200.

Power supply 204 is conventional; it receives low voltage alternating current power from the AC power supply 202 and supplies one or more direct current (DC) voltages to the rest of the alarm system. The distributed voltages may be regulated or unregulated depending on their ultimate use in the system. Backup battery 206 is charged by the power supply 204 under normal power conditions and supplies power to the rest of the system when AC mains power is unavailable. Many weather events, such as hurricanes and blizzards, can cause long duration power failures to occur. A battery with large capacity should be used to allow users to continue receiving alerts during the period of the emergency.

Alternatively, AC power supply 202 and power supply 204 could be combined into a switching power supply that takes mains level AC and converts it to direct current for the rest of the alarm circuitry.

The sensor interface 208 connects to fire sensors 210 and/or burglar sensors 212. The sensor interface 208 provides voltage level shifting between the sensors and the control and timing logic 214. The sensor interface 208 supplies a voltage or current that is passed to one or more sensors in loop configurations throughout a building or residence. The sensor interface 208 can support one or more loops. The sensor interface 208 monitors the status of the loops which can be normally closed (normal loop state is a closed circuit) or normally open (normal loop state is open circuit) and outputs the state of the loops to the control and timing logic 214. The circuitry of the sensor interface 208 will provide protection against external electromagnetic interference, such as lightning, ESD, radio waves, or other such noise. Additional noise rejection may also be performed by the control and timing logic 214. The loops may be monitored to provide an instant or a delayed alarm when the trigger conditions occur.

The control and timing logic 214 is a microcontroller or microprocessor with external memory. The microcontroller or microprocessor processes input states to determine if a change in the state of the alarm system is required. If a change of state is needed, the microcontroller or microprocessor will change its internal status as well as changing the state of outputs, such as sirens and relays. The microcontroller or microprocessor will also change the status presented to the user through the local user interface 224 and remote user interfaces 220. The status is also presented to the user through audible output devices such as the pre-alarm sounder 228 and siren 230. Processing of inputs and changing of output states may occur synchronously or asynchronously with other events in the system.

Antenna 218 provides a means for obtaining a radio frequency signal in the NOAA weather band (162.400 MHz to 162.550 MHz) of sufficient strength to provide usable audio and data under all conditions.

Weather receiver and decoder 216 is a standard narrowband FM receiver used in conjunction with circuitry to filter and decode the audio frequency shift keying (AFSK)data containing weather alerts, decode and qualify the WAT tone, and digitally compress the audio of the alert message. The outputs of the weather receiver and decoder 216 connect to the control and timing logic 214 for determination of alert conditions and for inclusion of the compressed audio into the serial data communication to the remote user interfaces 220. The weather receiver and decoder 216 may optionally output the audio of weather broadcasts and alerts to a speaker 232 for listening under the control of the local user interface 224.

Siren driver 226 contains circuitry that connects one or more sirens 230 to the power supply 204 during normal conditions or to the backup battery 206 during a power failure condition. The sirens 230 contain circuitry to generate and amplify an audio signal to a high audio level. Some types of sirens 230 are designed to generate multiple types of audio cadences or frequencies to differentiate between the fire and burglar alarm conditions. Alarm systems that do not use the sirens that generate multiple outputs will use two or more sirens (each with a different type of output) to differentiate the type of alarm. The siren driver 226 or a separate pre-alarm driver connected to the pre-alarm sounder 228 will give a warning before the sirens 230 are turned fully on to indicate the alarm condition. The pre-alarm sounder 228 is typically used only for the burglar alarm or to indicate non-critical conditions. A fire condition is more serious and must be indicated immediately. The pre-alarm sounder 228 commonly sounds at the beginning of the entry delay started at the beginning of an alarm cycle when a delayed zone is triggered to indicate to the user that the alarm should be disarmed before an alarm occurs and the sirens 230 are sounded. The pre-alarm function may also be supplemented or replaced by a speaker or sounder in the remote user interface 220. The pre-alarm sounder 228 might also be used to alert users at the beginning of weather alert condition. A distinctive cadence should be used; for example, a one second of pre-alarm on, then one second off—repeated three times. The pre-alarm sounder would likely be audible only within the household, so a similar alarm cadence output by the sirens 230 would alert users nearby the house. This feature should be user selectable.

The local user interface 224 provides functionality for a user to arm and disarm the system, program the system, and/or to indicate the status of the system, including alarms and alerts. Not all alarm systems have a local user interface 222. Instead the same functionality is provided by the remote user interfaces 220. If present, the local user interface 224 is sometimes located inside the enclosure of the alarm panel 200 so settings cannot be changed inadvertently or by persons without proper authorization.

The serial bus interface 222 connects to one or more remote user interfaces 220. The serial bus interface 222 supplies power to the remote unit and also provides voltage level shifting for serial data communications between the control and timing logic 214 and the remote user interfaces 220. The remote user interfaces 220 provide the functionality for a user to arm and disarm the system, program the system, and/or to indicate the status of the system, including alarms. The serial bus interface 222 also distributes the audio from the weather receiver and decoder 216 to the remote user interfaces 220 for decompression back to analog audio so it can be heard by users during alert conditions or whenever the user wants to listen to weather forecasts. Digital distribution of audio to the remote user interfaces 220 is superior to analog distribution since there are no signal losses in transmission of low-level signals. Digital distribution of audio is also superior compared to high speaker-level signals since there is no need for impedance matching of combinations of speakers to the central audio amplifier due to each remote user interface 220 having its own speaker. Digital distribution of audio is also superior due to its loss-less transmission of the audio regardless of the number of remote user interfaces 220 or distance to the remote user interfaces 220.

Both the local user interface 224 and the remote user interfaces 220 may have functionality to allow the user to program settings such as entry and exit delays, enablement or disablement zones, bypass zones, or interact with other features of the alarm system. In addition to the functionality providing for setup of fire and burglar, the local user interface 224 and remote user interfaces 220 provide a means for the user setup of weather alerts. Settings for weather would include: one or more FIPS codes to identify the physical location of the system, enablement and disablement of specific weather conditions that the user determines are not appropriate for their location, and selection of the method of alerting with sound (using the speakers in the local user interface 224 and remote user interfaces 220 or in conjunction with a recognizable cadence of the siren(s) 230). The local user interface 224 consists of status indicators such as light emitting diodes or a liquid crystal display and switches, usually a numeric keypad, as well as other function related keys. The keypad and function keys are used both for entry of numbers to arm and disarm the system and also to program user settings.

Figure 3:
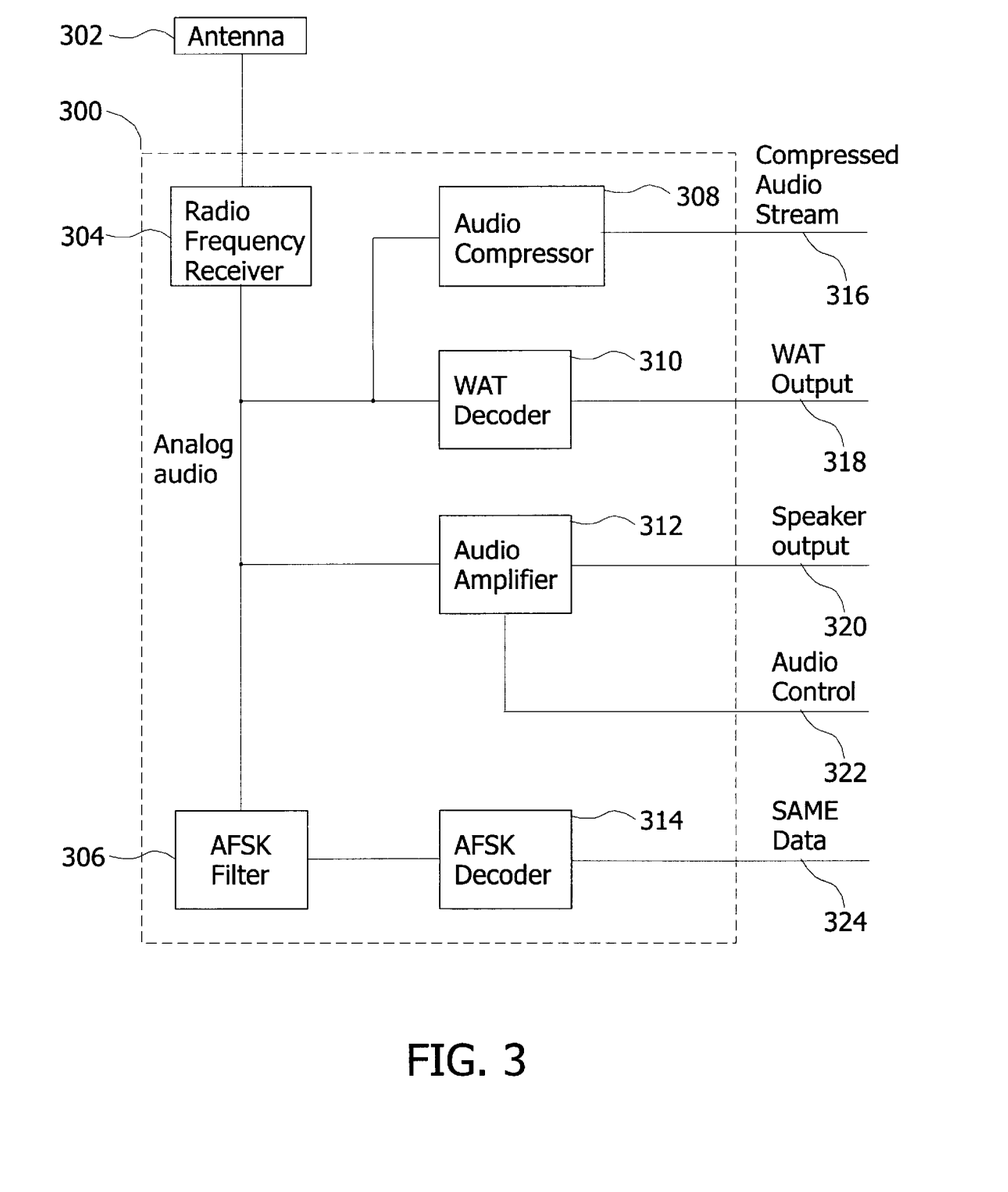
FIG. 3 is a block diagram of the elements required to receive and process a severe-weather alert.

FIG. 3—Severe Weather Receiver

FIG. 3 shows the elements of a functional receiver to detect and decode severe weather broadcasts.

The weather alert receiver and decoder 300 consists of electronic circuitry to receive the SAME weather alert transmissions, demodulate the audio containing the verbal weather alert, and decode the transmitted data containing the weather alert in symbolic form.

The antenna 302 provides a means for obtaining a radio frequency signal in the NOAA weather band (162.400 MHz to 162.550 MHz) of sufficient strength to provide usable audio and data under all conditions. A telescoping whip antenna is sufficient for most installations. However, for systems in locations at the fringe of the NWS station's reception area an larger external antenna such as a dipole or a vertical wire will be needed to increase the received signal to an acceptable level.

The radio frequency receiver 304 is a standard narrow band VHF FM receiver designed to receive only the 7 frequencies broadcast by the NWS. A wide variety of special integrated circuits for this function are available including the Motorola MC3361C. All operating parameters should match the signal specifications from the NWS.

The AFSK (audio frequency shift keying) filter 306 can be as simple as a standard bandpass filter implemented in analog circuitry.

The audio compressor 308 is analog and/or digital circuitry to convert the audio into a digital representation that can be serially transmitted for remote listening. Standard compression techniques such as continuously variable delta modulation (CVSD) and adaptive differential pulse code modulation (ADPCM) give sufficient quality at low bit rates for the weather alert audio. The NWS has recently begun using computer-synthesized speech for the weather radio broadcasts. So care should be taken to choose a compression and bit rate that does not overly distort the lower quality speech signal. The compressed audio is passed via the compressed audio stream 316 to the system controller for distribution throughout the system. The compressed audio stream 316 can be in a serial or parallel format.

The WAT (Warning Alert Tone) decoder 310 is a standard tone decoder such as a National Semiconductor LM567. The WAT decoder is tuned to detect the 1050 Hz tone broadcast preceding the voice alert portion of a weather alert. The determination of a tone of sufficient duration to indicate an alert can be made by discrete circuitry or by the microcontroller or microprocessor of the system. The indication of a detected WAT tone is connected to the system through the WAT output 318.

The audio amplifier 312 is a standard amplifier for the audio band, 300 Hz to 3 kHz, such as the National Semiconductor LM386 or equivalent. The audio amplifier is connected through the speaker output 320 to a speaker for listening in the vicinity of the alarm panel. The audio amplifier 312, including volume control and mute functions, is under the control of the alarm systems microcontroller or microprocessor through the audio control 322 connection.

The AFSK decoder 314 is a standard integrated circuit such as the EXAR 2211A specifically designed for FSK demodulation. The serial data stream is passed as a digital signal to the system microcontroller or microprocessor through the SAME data 324 connection.

Note that all of the functions of the AFSK filter 306, audio compressor 308, WAT decoder 310, and AFSK decoder 312 can be performed in software running on a high speed microcontroller, microprocessor, or digital signal processor (DSP). Examples of such parts are the Scenix SX28 and SX48 microcontrollers and Texas Instruments TMS320C1X and TMS320C2X DSP families.

Figure 4:
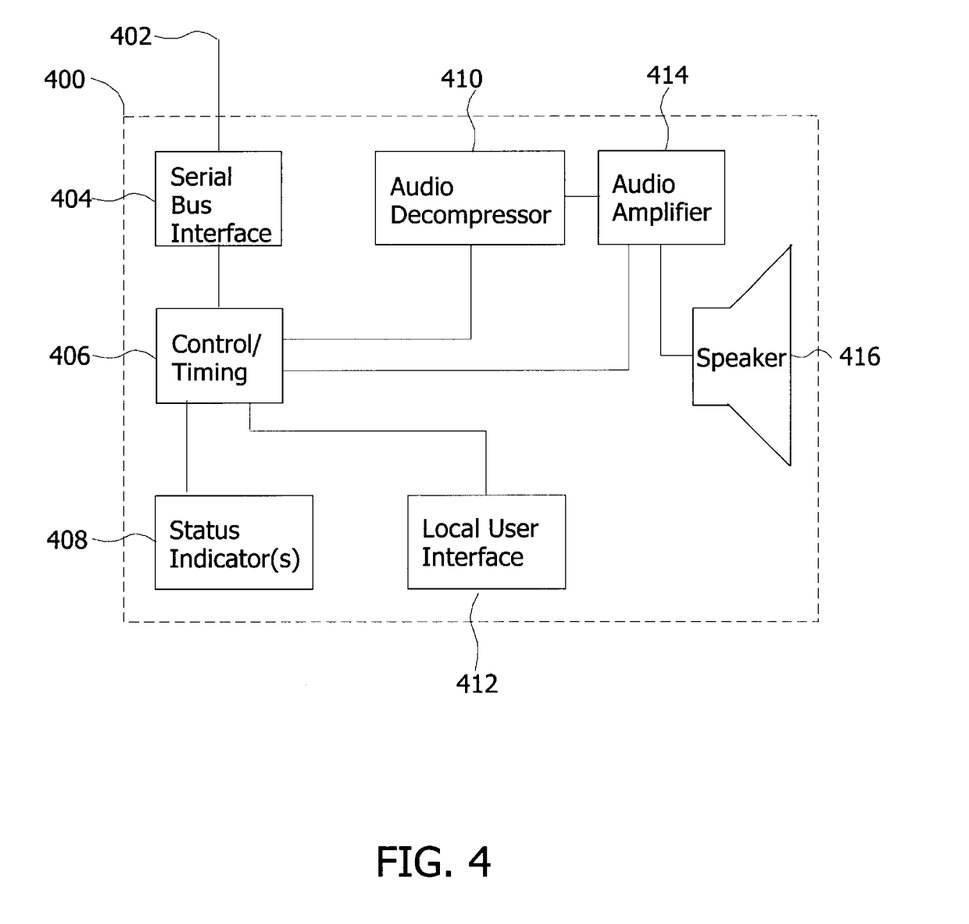
FIG. 4 is a block diagram of a remote user interface as shown in FIG. 1 and FIG. 2.

FIG. 4—Remote User Interface

FIG. 4 shows the elements of a functional remote user interface. The interface allows a user to interact with, and see and hear weather, burglar, or fire alerts from the alarm panel. The interface also allows the user to perform the functions needed to: program system parameters such as selecting whether a zone alarm time is instantaneous or delayed, program user selectable parameters such as entry and delays, program weather related parameters such as the local NWR station frequency and FIPS code, and interact during the normal operation of the system such as arming, disarming, and canceling alarms and alerts.

The remote user interface 400 provides the means for the user to interact with the alarm system at a distance from the alarm panel. The remote user interface 400 transmits and receives data to the alarm panel through the serial bus 402. Information such as fire, burglar, and weather alert status, user interface status, such as keypresses, system sounds such as key beeps, audio from NWS broadcasts, and other data are sent back and forth on the serial bus 402. The serial bus interface 404 translates the signal levels used on the serial bus 402 to the logic level signals used within the remote user interface 400.

The remote UI control and timing 406 provides the means to decode and encode data to and from the serial bus, translate the data from the alarm panel so it can be displayed on the status indicators 408, accept input from users with the local user interface 412 and be output in audible form using the audio decompressor 410, audio amplifier 414, and speaker 416. The status indicators 408 consist of LEDs and/or a text display, such as a multi-segment LED or LCD display. The status indicators 408 provide feedback to the user during all operations and show the current and possibly the historical state of the alarm system.

The audio decompressor 410 reverses the compression used by the alarm panel to distribute the audio digitally to the remote user interfaces 400. Standard algorithms to decompress CVSD, ADPCM, or other formats are widely known. The resultant audio signal is fed into the audio amplifier 414 to be translated to high levels for output to the speaker 416. The audio amplifier 414 is a standard amplifier for the audio band, 300 Hz to 3 kHz, such as the National Semiconductor LM386 or equivalent. The audio level during the non-alarm/non-alert time is user controllable through the local user interface 412. A secondary audio output transducer such as a piezo element might also be used to increase the sound level for initially alerting the user to alarm and weather alert conditions.

Preferred Embodiment—Operation

During the non-alarm condition of the alarm panel 200, the user interacts with the system through the local user interface 224 or the remote user interfaces 220. The user enters system parameters including the conditions required to cause a burglar alarm and the NWS station frequency and FIPS code for their geographical location. In addition, the user performs basic functions such as arming and disarming the system as well as viewing the status of the zones.

When a fire or burglar intrusion event occurs, the fire sensors 210 or burglar sensors 212 present a change of state to the sensor interface 208 that is translated into logic level inputs to the control/timing logic 214. The control/timing logic 214 further qualifies the sensor inputs to prevent inadvertent activation by noise or other signals.

If a valid fire or burglar event has been detected, the control/timing logic 214 compares it to the settings input by the user. If a fire event is ongoing, the control/timing logic 214 immediately turns on the siren driver 226 and siren 230 to indicate a fire. If a burglar event is ongoing and the user has programmed the zone corresponding to the change of state for immediate response, the control/timing logic 214 immediately turns on the siren driver 226 and siren 230 to indicate an intrusion. If a burglar event is ongoing and the user has programmed the zone corresponding to the change of state for delayed response, the control/timing logic 214 turns on the pre-alarm sounders 228. After a time period preset in the system or programmed by the user, the siren driver 226 and sirens 230 are turned on to indicate the intrusion. In all three cases, the local user interface 220 and remote user interfaces 224 are updated to indicate the ongoing condition of the alarm system. During the fire condition, the siren driver 226 and sirens 230 continue until a user manually resets the alarm using the local user interface 224 or the remote user interfaces 220. During the burglar condition, the siren driver 226 and sirens 230 are turned on for a preset time, then shut off. The sirens 230 can be also be turned off by the user with the local user interface 224 or the remote user interfaces 220.

When a weather event occurs, the signal is received by the antenna 302 and demodulated into an audio signal by the radio frequency receiver 304. The audio signal is filtered by the AFSK filter 306 to remove all audio frequencies outside of the passband of the AFSK signal. The AFSK decoder 314 demodulates the AFSK signal into a logic-level serial data stream of the NWS SAME data.

The control/timing logic 214 decodes the data content of each of the three incoming SAME messages and buffers them in memory. When the control/timing logic 214 determines that the received messages are valid and without error, the control/timing logic 214 compares the geographical information in the received message with the geographic information entered by the user of the system, specifically the FIPS code and location within the user's county. If the locations match, the control/timing logic 214 reformats the weather alert information and sends the information to the local user interface 224 and remote user interfaces 220 for display throughout the user's premises. The local user interface 224 and remote user interfaces 220 indicate some portion of the data including the type of weather condition and the severity of the alert—statement, watch, or warning. Other information that can be displayed such as the duration of the event may or may not be supported by the user interface or may be elected by the user to be turned on or off. The control/timing logic 214 starts a timer based on the duration of the event. When the timer expires, the display of the weather event is discontinued on the local user interface 224 and remote user interfaces 220.

If the WAT tone is transmitted, the WAT decoder 310 detects the 1050 Hz tone and sends a signal on the WAT output 318 to the control/timing logic 214. If the SAME messages have not been received or have been received with errors, the WAT tone may be used instead to initiate a weather alarm.

During or after one of the following conditions is met, the SAME data has been determined to be valid and without error or the WAT tone has been validated, the control/timing logic 214 turns on the audio amplifier 312 using the audio control 322 so the audio from the weather alert broadcast is output to the speaker 232. At the same time, the control/timing logic 214 takes the compressed audio from the audio compressor 308 and combines it in into the serial data sent to the remote user interfaces 220. The remote user interfaces 220 decompress, amplify, then output the audio to the their speakers 416 using the serial bus interface 404, control/timing logic 406, audio decompressor 410, audio amplifier 414 respectively. The user can control the audio volume using the local user interface 412. After a preset time, the audio output through speaker 232 and speakers 416 is turned off. The user may also choose the option of using the pre-alarm sounders 228 and/or the sirens 230 to precede the audio output of the weather alert with a very high volume, distinctive-cadence tone or tones to draw attention to the weather alert even outside of the user's house.

Other Embodiments

It is anticipated that other embodiments of the invention might be implemented to lessen or increase functionality, decrease cost, and/or decrease complexity. An example of decreased cost would be a system using multiple LEDs, each associated with a pre-defined or user-specified alert, as the indicators in the user interface instead of using a general-purpose liquid crystal display to display text detailing the current alert. This would decrease system cost. Many implementations may choose to only distribute text messages, without audio, to the remote user interfaces. Other implementations might include analog distribution of audio to remote speakers. Audio-only remote user interfaces may be used to distribute alerts where it is not desirable or physically feasible to mount a full-featured user interface. An example would be ceiling-mounted speakers in large rooms, stairwells, etc. where sound is needed, but user interaction and user viewing of the type of alert in text form is not. In a similar fashion, multicolor LEDs, discrete LEDs of different colors, or other indicators could be used to indicate specific weather conditions without audio.

It is further anticipated and expected that wireless connectivity may be employed between the alarm system, the sensors, and the remote user interfaces instead of the wired system described herein.

It is also anticipated that in addition to the alerts provided by the weather receiver, the alarm system itself may be capable of detecting severe weather with appropriate sensors. Representative sensors would include the ability to detect and measure wind, rain, snow, and tornado. The more comprehensive information would improve alerts as well as being a convenience to users. Additional less critical alerts of extremes of temperature, air quality, ultraviolet radiation, or other environmental conditions might also be detected with appropriate sensors and indicated to the user.

It is further anticipated that home intercom systems might be upgraded significantly to add the weather alert feature as well as the additional functions needed to support it, including visible indicators or displays as well as battery backup.

While the invention has been particularly shown and described with reference to a preferred embodiment thereof, it will be understood by those skills in the art that various other changes in the form and details may be made without departing from the spirit and scope of the invention.

What is claimed is:

1. Apparatus for an annunciating system for selectably annunciating, at an area encompassed by the annunciating system, a first anomaly condition detected within the area encompassed by the annunciating system and a second anomaly condition detected externally to the area encompassed by the annunciating system, the second anomaly condition identified by an alert, the alert formed at least of a digital message, the digital message containing indicia of the second anomaly condition, said apparatus comprising:

a detector to receive indications of the first anomaly;

a receiver coupled to receive the indicia contained in the digital message indicating the second anomaly condition, said receiver for detecting reception thereat of the indications of the warning and for decoding values of the indicia contained in the digital message; and an annunciator coupled to said detector and to said receiver, said annunciator for annunciating, in human perceptible form, detection of the first anomaly condition at said detector and detection and decoding at said receiver of the values of the indicia contained in the digital message indicating the second anomaly condition, annunciations made by said annunciator indicating decoded representations of the digital message and of the first anomaly condition.

2. The apparatus of claim 1 wherein a second alert comprises a radio signal forming a weather anomaly condition alert generated by an alerting authority.

3. The apparatus of claim 2 wherein the radio signal is of frequency characteristics corresponding to a publicly-accessible radio band.

4. The apparatus of claim 3 wherein said receiver comprises a radio receiver tunable to the publicly-accessible radio band.

5. The apparatus of claim 3 wherein the alerting authority comprises a weather-service authority.

6. The apparatus of claim 5 wherein the annunciator generates at least an aural annunciation of the detection of the of the radio signal.

7. The apparatus of claim 1 wherein the annunciating system comprises a home alarm system, the area encompassed by the annunciating system comprises a residence, and wherein said receiver is positioned at least proximate to the residence.

8. The apparatus of claim 7 wherein said annunciator annunciates the detection of the indications of the warning at the residence.

9. The apparatus of claim 1 wherein said annunciating system is further operable to annunciate the first anomaly in a first manner, and wherein annunciations made by said annunciator to annunciate detection of the second anomaly are made in a second manner.

10. A method for selectably annunciating, at an area encompassed by an annunciating system, a first anomaly condition detected within the area encompassed by the annunciating system and a second anomaly condition detected externally to the area encompassed by the annunciating system, the second anomaly condition identified by an alert, the alert formed at least of a digital message, the digital message containing indicia of the second anomaly, said method comprising:

detecting indications of the first anomaly condition;

detecting reception at a receiver of the indicia contained in the digital message of the alert indicating the second anomaly condition;

decoding values of the indicia contained in the digital message detected during said operation of detecting reception; and annunciating, in human perceptible form, the detection of the first anomaly and the detection and decoding of the values of the indicia contained in the digital message indicative of the second anomaly condition and decoded during said operation of decoding.

11. The method of claim 10 wherein the alert detected during said operation of detecting indications is generated at a location beyond the encompassing area.

12. The method of claim 10 wherein the warning detected during said operation of detecting reception comprises a radio signal generated by an alerting authority.

13. The method of claim 12 wherein the radio signal of which the warning detected during said operation of detecting is of frequency characteristics corresponding to a publicly-accessible radio band.

14. The method of claim 13 wherein the alerting authority which generates the radio signal detected during said operation of detecting comprises a weather-service authority.

15. The method of claim 10 wherein said operation of annunciating comprises at least aurally annunciating.

* * * * *